No. 752,585. PATENTED FEB. 16, 1904.
C. E. PAULSON.
HAY RAKE AND COCKER.
APPLICATION FILED DEC. 8, 1902.
NO MODEL. 3 SHEETS—SHEET 1.

Witnesses
Inventor
Chris E. Paulson,
By Paul & Paul
his attorneys

No. 752,585. PATENTED FEB. 16, 1904.
C. E. PAULSON.
HAY RAKE AND COCKER.
APPLICATION FILED DEC. 8, 1902.
NO MODEL. 3 SHEETS—SHEET 2.

Witnesses

Inventor
Chris E. Paulson
By Paul & Paul
his attorneys

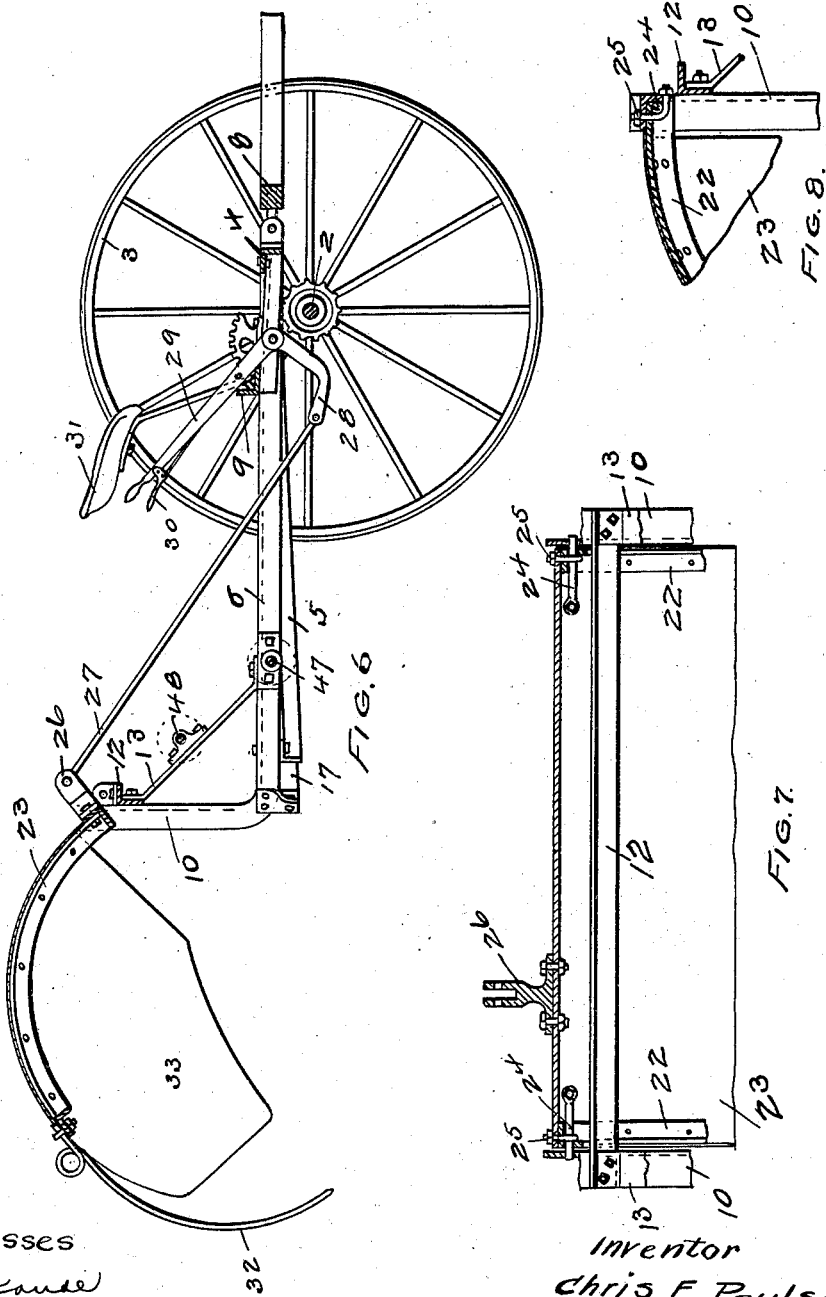

No. 752,585. Patented February 16, 1904.

UNITED STATES PATENT OFFICE.

CHRIS E. PAULSON, OF BOYD, MINNESOTA.

HAY RAKE AND COCKER.

SPECIFICATION forming part of Letters Patent No. 752,585, dated February 16, 1904.

Application filed December 8, 1902. Serial No. 134,225. (No model.)

*To all whom it may concern:*

Be it known that I, CHRIS E. PAULSON, of Boyd, Lac qui Parle county, Minnesota, have invented certain new and useful Improvements in Hay Rakes and Cockers, of which the following is a specification.

My invention relates to agricultural implements, and has for its primary object to provide an efficient and durable machine for cocking hay in the field and also designed as an improvement over the machine shown and described in Letters Patent of the United States issued to me September 10, 1901, Serial No. 682,229.

A further object is to provide a machine that may also be utilized for gathering hay in rows.

Other objects of the invention will appear from the following detailed description.

The invention consists generally in the forwardly-diverging gatherers, a rear rake, and the tedders provided in advance of said gatherers.

Further, the invention consists in tedders provided in front of the rear rake and arranged to pitch the hay toward the same and oppositely-operating tedders provided in front of the side gatherers.

Further, the invention consists in various constructions and combinations, all as hereinafter described, and particularly pointed out in the claims.

Figure 1:
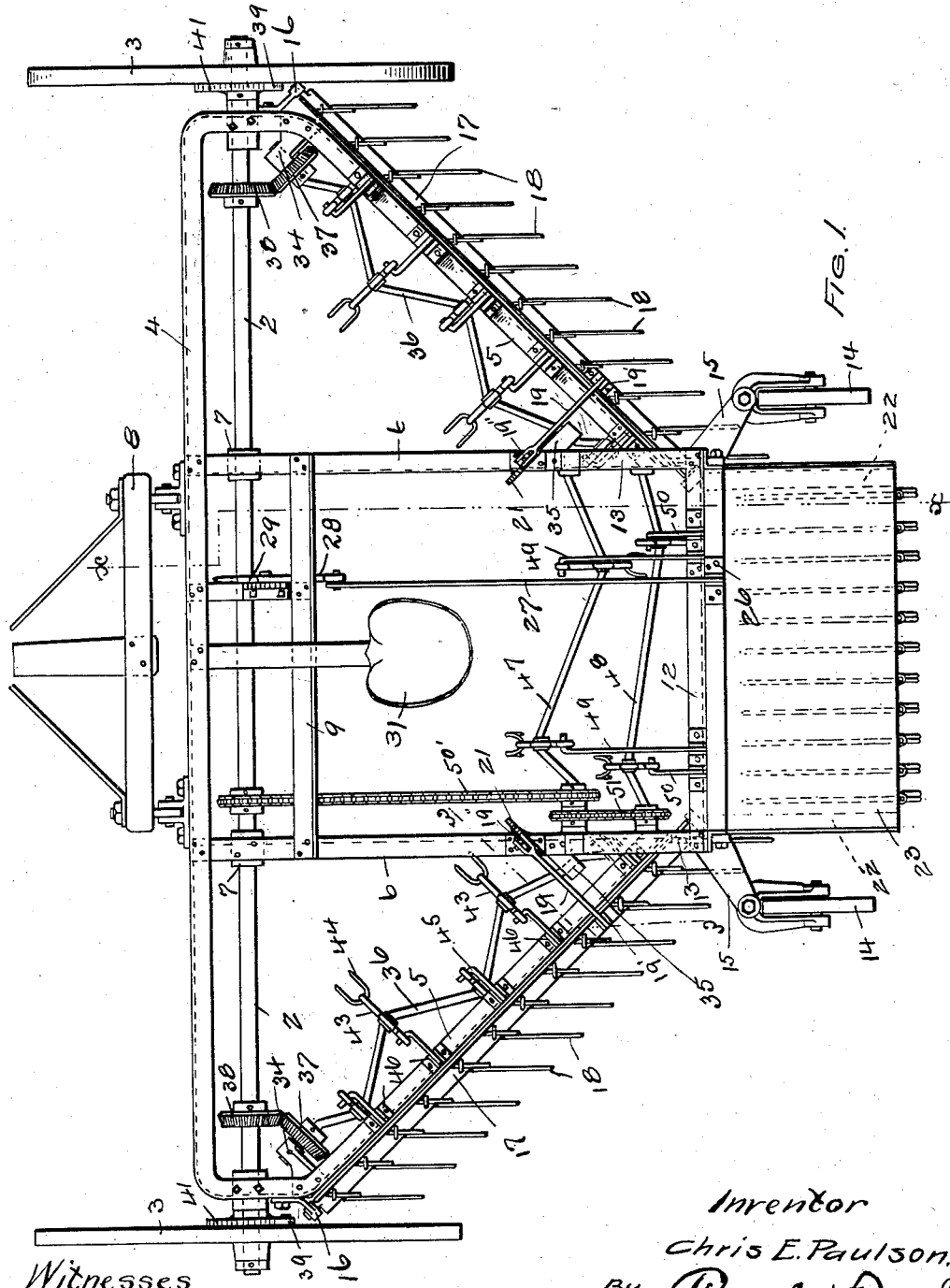
Figure 2:
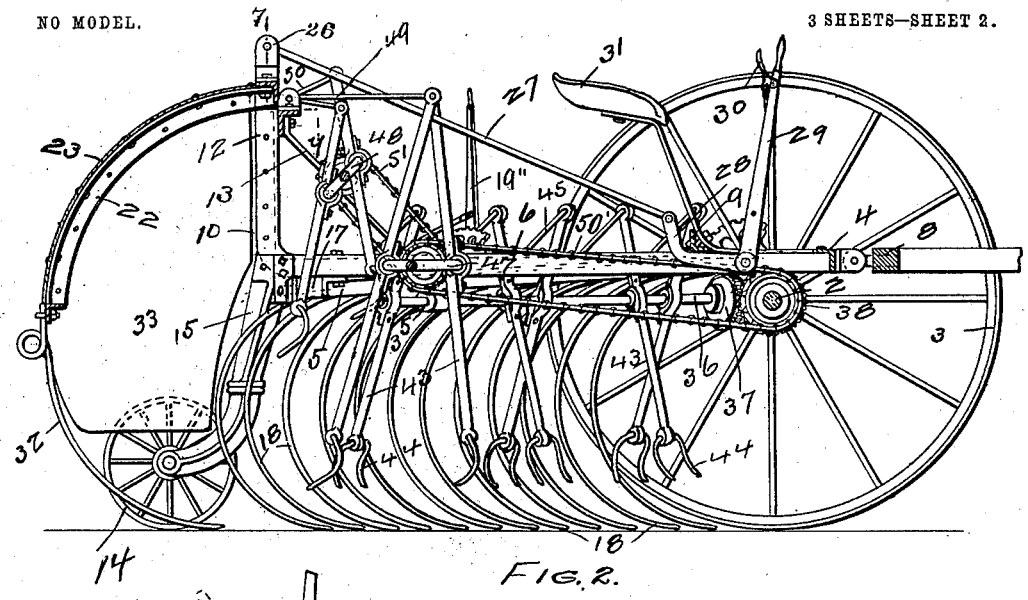
Figure 3:
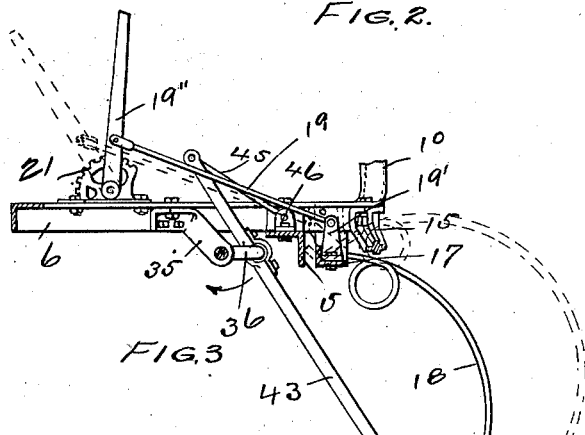
Figures 4, 5:
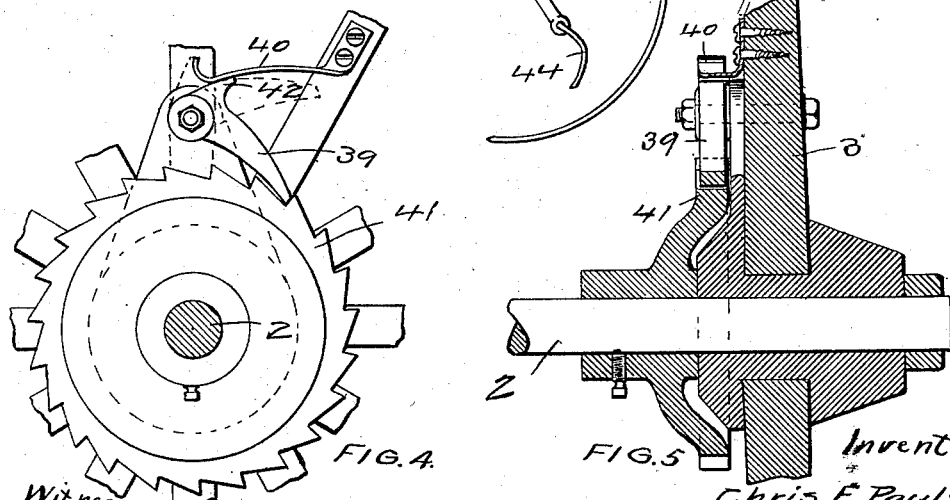

In the accompanying drawings, forming part of this specification, Figure 1 is a plan view of a machine embodying my invention. Fig. 2 is a section on the line $x\ x$ of Fig. 1. Fig. 3 is a section on the line $w\ w$ of Fig. 1. Figs. 4 and 5 are detail views of the gear mechanism or driving connection between the axles and the wheels. Fig. 6 is a section showing the rear rake in its raised position. Figs. 7 and 8 are details in section, showing the manner of hinging the rear rake on the frame of the machine.

In the drawings, 2 represents the axle, 3 the wheels, and 4 the forward portion of a triangular frame made, preferably, of angle-iron and bolted securely to the axle.

5 represents inwardly-turned bars forming the rear portion of the frame, secured at their rear ends to parallel bars 6, that extend forward between the bars 5 and are secured to boxes 7 on the axle and also to the forward portion 4 of the frame.

The usual draft appliance 8 is provided on the frame 4.

The bars 6 are preferably of angle-iron connected by the cross-bar 9 and having upwardly-turned rear ends 10. This angle-iron construction forms a comparatively light but extremely rigid support for the operating mechanism of the machine. An angle-bar 12 also connects the upright ends or standards 10, and braces 13 are provided connecting said ends 10 with the bars 6.

The rear portion of the frame is supported upon caster-wheels 14, mounted in suitable standards or brackets 15.

Secured to the bars 5 are straps 16, wherein the bars 17 are pivotally supported, said bars being provided at intervals with rake-teeth 18. The bars 17 extend parallel to the bars 5 and with them diverge from the rear portion of the machine toward the axle thereof, and the effect, therefore, of the rake-teeth composing the gatherers on each side of the machine will be to gather up the hay and roll it forward. I prefer to provide each gatherer with a link 19, pivoted to a bracket 19' on the bar 17 and also pivotally connected with a lever 19", provided on each bar 6 and operating over a quadrant 21, by means of which the gatherer can be tilted and locked in any desired position.

Between the rear ends of the bars 5 I provide a curved angle-iron frame 22, having a sheet-metal hood or covering 23 and pivoted on the upright ends 10 by means of bolts 24, secured at one end to the hood 23 and passing through U-shaped clips or bolts 25 into said upright ends. (See Figs. 7 and 8.) The frame 22 swings freely on the bolts 24 as its pivots, and a bracket 26 is provided on the hood 23, pivotally connected by a rod 27 with a curved arm 28, provided on a lever 29, said lever having the usual locking-latch 30 and located near a seat 31, that is secured to the forward portion 4 of the angle-iron frame.

By means of this lever the operator, seated on the machine, can tilt the frame 22 into any desired position. As shown in Fig. 2, the pivot of the rod 27 and arm 28 is above the center of the lever-pivot, and the rear rake is thereby locked when in its down position. Upon the lower edge of the frame 22 I provide a series of rake-teeth 32, and at the sides of said frame I provide depending hay shields or guards 33, preferably of sheet metal and extending down to a point near the middle of said rake-teeth. I prefer to provide the frame 22 to support the rear rake-teeth instead of supporting them near the pivot of said rake on the frame, as I am thus able to use a shorter tooth and one that can be more easily controlled than the long springy teeth of my former patent.

Upon each of the bars 5 and 6 I mount bearing-boxes 34 and 35 and provide multiple crank-shafts 36, supported in said boxes and provided with beveled gears 37, that mesh with similar gears 38 on the axle 2. I prefer to provide gear connections between the axle and the wheels, consisting of dogs 39, pivoted on the wheel-spokes and normally held by springs in engagement with the teeth of ratchet-wheels 41, secured on the axle 2. Each dog 39 is preferably provided with a lug 42, and the ends of the springs 40 are preferably upwardly curved to engage said lugs and hold the dogs out of contact with the ratchets 41 when said dogs are lifted to the position shown by dotted lines in Fig. 4. The operator can thus at any time throw the driving connections out of mesh and stop movement of the multiple shafts. Upon each shaft I provide a series of tedder-arms 43, having tedder-forks 44 at their lower ends and pivotally connected at their upper ends by links 45 with brackets 46, secured on the bars 5. The revolution of the shafts 36 will therefore impart a gyrating movement to the tedder-arms, throw the forks 44 into the hay, and pitch or toss the same forward toward the space in front of the rear rake and prevent the forwardly-diverging gatherers from becoming clogged with the hay, which I have found to be an objection to the machine set forth in my patent above referred to.

Between the multiple crank-shafts 36 I provide two other similar shafts 47 and 48, mounted in bearings in the bars 6 and carrying tedders and tedder-bars corresponding to those above described and pivotally connected with the cross-bar 12 by links 49 and 50. The shafts 47 and 48 are driven in the opposite direction from the shafts 36 by chains 50' and 51, connecting, respectively, sprockets on the axle 2 and the shaft 47 and the shafts 47 and 48. The chain connection with the axle will drive the shafts 47 and 48 in the opposite direction to that of the shafts 36, and the tedders carried by said shafts 47 and 48 will pitch the hay thrown in front of them by the action of the side tedders back into the rear rake, which will roll it into bunches or cocks as the machine is drawn over the field.

The following is a brief description of the operation of my machine: The side and rear rakes having been lowered to an operative position and the machine started, the tedders provided in front of the side gatherers will engage the hay and pitch it forward into the space in front of the rear rake and prevent the side rakes from becoming clogged. The middle tedders, engaging the hay pitched forward by those at the sides and working in a substantially opposite direction, will throw the hay back toward the rear rake and have a tendency to pack it therein, so that the bunches or cocks as they are rolled up by the rear rake will be compact and will require but little, if any, attention after being discharged from the machine. The construction of the rear rake will render it more efficient and the teeth will require less tension than those ordinarily employed for this purpose, and at any time by the operation of the lever mechanism the side gatherers and the rear rake may be tilted on their pivots and lift them to an inoperative position. The tilting of the rear rake, as shown in Fig. 6, will discharge the hay therein to form a cock, and while I have shown a hand-lever mechanism for this purpose other equally efficient means may be provided. Whenever desired, the driving means provided between the axle and the wheels may be disconnected to allow the machine to be operated without the tedders.

I claim as my invention—

1. The combination, with the wheeled frame, of a rear rake, the forwardly-diverging side gatherers, or rakes also provided on said frame, multiple crank-shafts provided on said frame in front of said side rakes, means for driving said crank-shafts from the machine-axle, and gyrating tedders pivotally supported on said shafts and having pivotal connections with said frame.

2. The combination, with a wheeled frame, of a rear rake, forwardly-diverging rakes or gatherers, multiple crank-shafts provided in advance of said rear rake and said gatherers, operative connections provided between said crank-shafts and the machine-axle for driving said shafts in opposite directions, and a series of tedders provided on said shafts.

3. The combination, with a wheeled frame, of a rear rake, forwardly-diverging rakes or gatherers, multiple crank-shafts mounted in bearings in said frame in advance of said gatherers, suitable gearing connecting said shafts with the machine-axle, driving connections provided between said axle and the machine-wheels, a series of tedders provided on said multiple shafts and operating to pitch the hay forward toward the space in front of said rear rake, and pivotal connections provided between said tedders and said frame.

4. The combination, with an axle and wheels, of a frame mounted thereon and having converging rearwardly-projecting bars, caster-wheels provided near the rear ends of said bars, a rear rake supported by said frame between said bars, diverging rakes or gatherers pivotally supported upon each side of said rear rake, multiple crank-shafts, suitable gearing connecting said shafts with said axle, driving connections provided between said axle and said wheels, tedders provided on said shafts in front of said gatherers and having pivotal connections with said bars, and tedders provided in front of said rear rake, substantially as described.

5. The combination, with an axle and wheels, of a frame comprising a forward part 4 secured to said axle and rearwardly-converging parts 5, bars 6 connecting said parts 5 with said axle, cross-bars connecting said bars 6, means supporting the rear ends of said bars 6, a rear rake pivotally mounted in said bars 6, means for tilting said rear rake and forwardly-diverging rakes or gatherers pivotally supported by said parts, 5, substantially as described.

6. The combination, with an axle and its wheels, of a frame comprising a part 4 secured to said axle and rearwardly-converging parts 5, bars 6 connecting said parts 5 with said axle, cross-bars connecting said bars 6 and said parts 5, a rear rake pivotally supported, forwardly-diverging gatherers or rakes pivoted on said parts 5 and gyrating tedders provided in advance of said diverging rakes and arranged to pitch the hay forward into the space in front of said rear rake.

7. The combination, with an axle and its wheels, of an angle-bar frame comprising the part 4 secured thereon and the rearwardly converging parts 5, bars 6 connecting said parts 5 with said axle and said part 4 and having upwardly-turned rear ends, cross-bars connecting said bars 6 and said upwardly-turned ends, a rear rake pivotally supported by said upwardly-turned ends, forwardly-diverging gatherers or rakes pivotally supported by said parts 5, multiple crank-shafts provided in advance of said diverging rakes and said rear rake, tedders arranged thereon, and means for driving said shafts in opposite directions from said axle, for the purpose specified.

8. The combination, with an axle and its wheels, of a triangular angle-bar frame mounted on said axle with its base-rail near and substantially parallel therewith, a rear rake provided at the apex of said frame and substantially parallel with said base-rail, and forwardly-diverging gatherers provided in advance of said rake and in the rear of said axle and supported respectively by the side rails of said frame, substantially as described.

9. The combination, with an axle and wheels, of a frame secured to said axle and having rearwardly-converging bars 5, bars 6 connecting said bars 5 with said axle and having upwardly-turned rear ends, a rear rake supported by said ends, and forwardly-diverging gatherers provided in advance of said rear rake.

10. The combination, with an axle and wheels, of an angle-bar frame secured to said axle and having rearwardly-converging bars 5, bars 6 connecting said bars 5 with said axle and having upwardly-turned rear ends, a cross-bar 12, a rear rake pivotally supported on said upwardly-turned rear ends, and forwardly-diverging gatherers provided in advance of said rake.

11. The combination, with a wheeled frame, having bars provided with upwardly-turned rear ends, of a rake pivotally supported between said bars and comprising a frame 22, teeth secured thereon, and hay-guards 33.

In witness whereof I have hereunto set my hand this 1st day of December, 1902.

CHRIS E. PAULSON.

In presence of—
  JULIUS PAULSON,
  CARRIE PAULSON.